C. W. PARKER.
TRANSMISSION GEARING.
APPLICATION FILED MAR. 26, 1909.
941,035.
Patented Nov. 23, 1909.
2 SHEETS—SHEET 1.
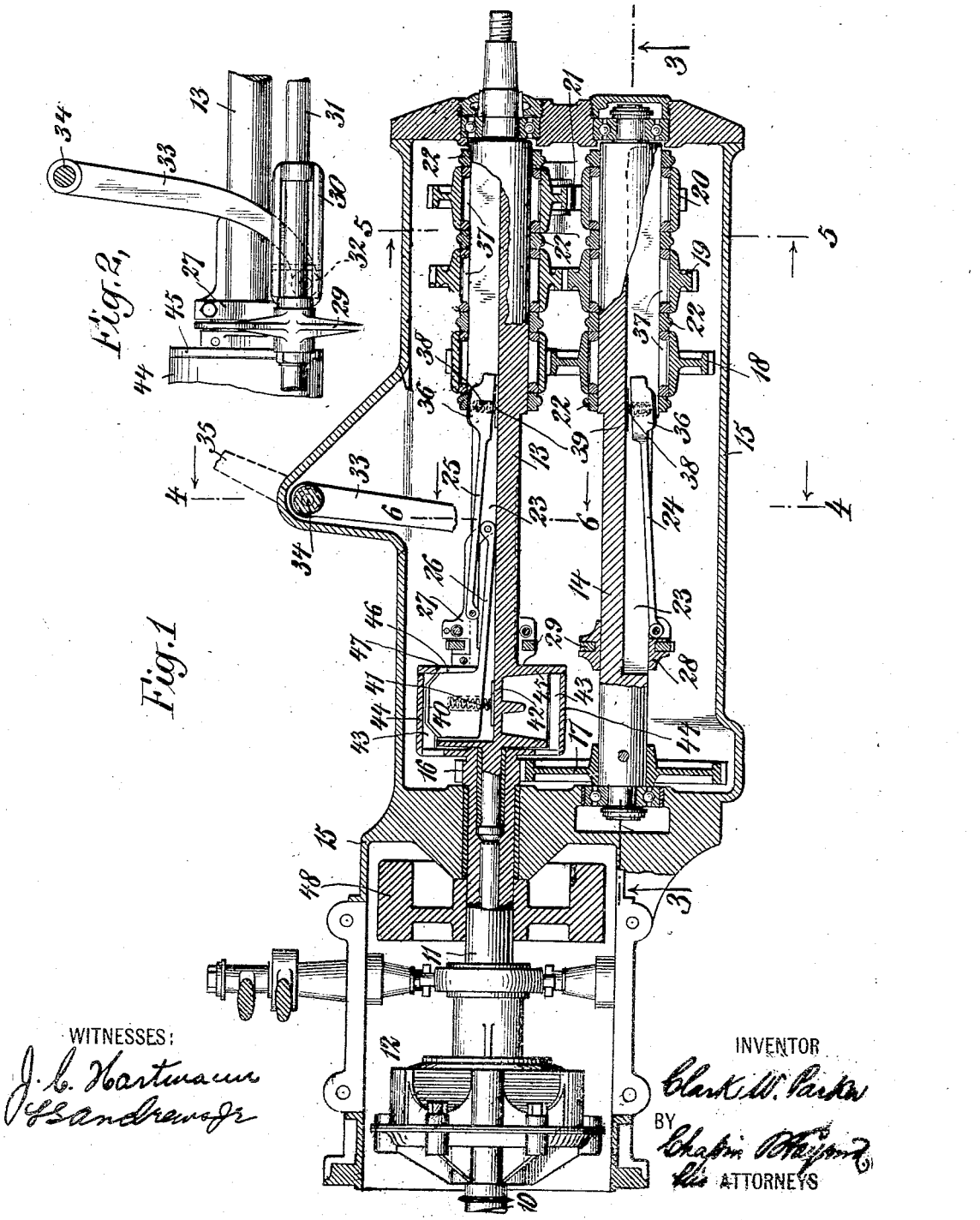
WITNESSES:
J. C. Hartmann
J. S. Andrews Jr.
INVENTOR
Clark W. Parker
BY
Chapin & Wyant
his ATTORNEYS

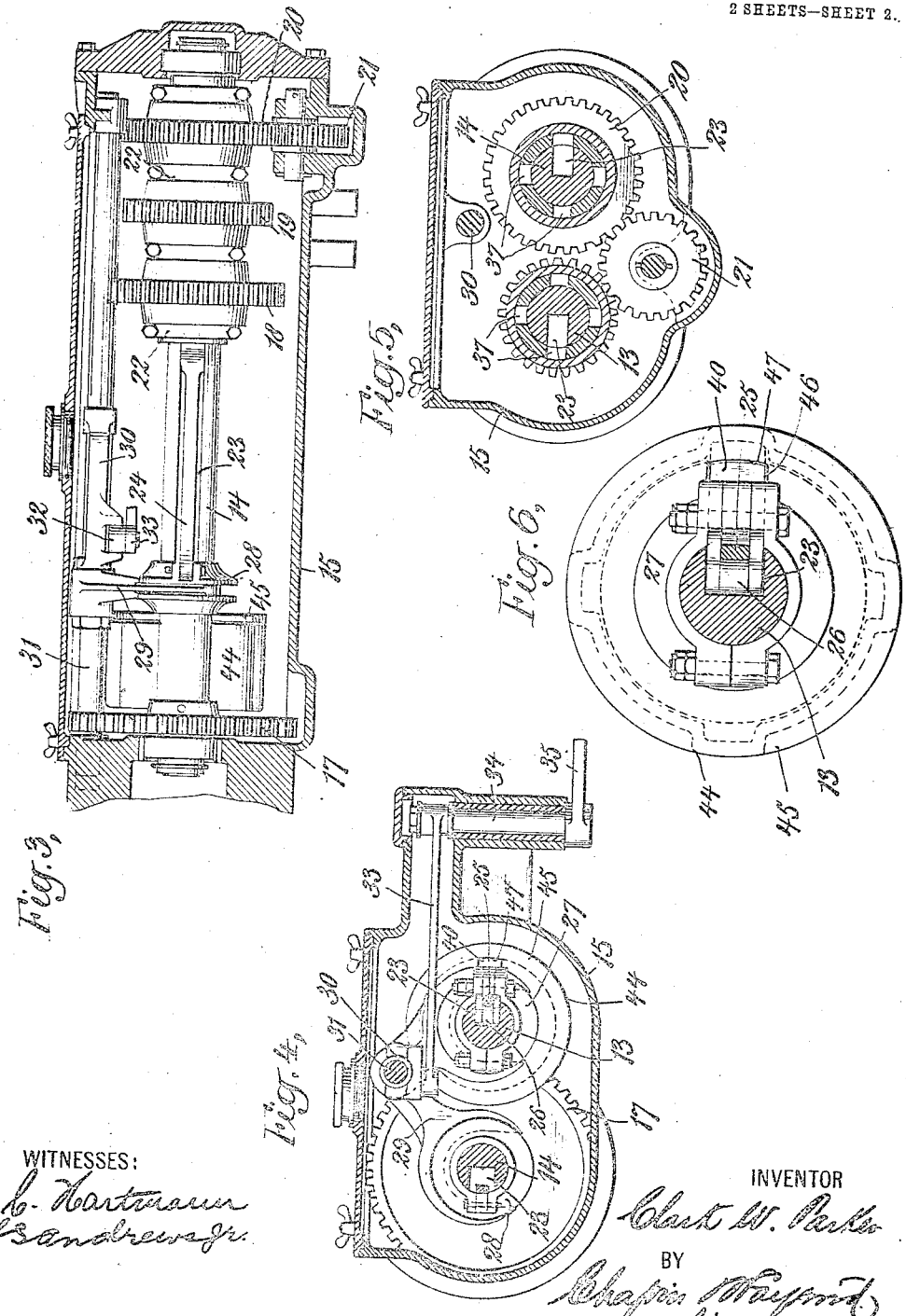

UNITED STATES PATENT OFFICE.

CLARK W. PARKER, OF SPRINGFIELD, MASSACHUSETTS, ASSIGNOR TO LAMB KNITTING MACHINE COMPANY, OF CHICOPEE FALLS, MASSACHUSETTS, A CORPORATION OF MASSACHUSETTS.

TRANSMISSION-GEARING.

941,035.

Specification of Letters Patent.

Patented Nov. 23, 1909.

Application filed March 26, 1909. Serial No. 486,056

*To all whom it may concern:*

Be it known that I, CLARK W. PARKER, a citizen of the United States of America, and a resident of Springfield, county of Hampden, and State of Massachusetts, have invented certain new and useful Improvements in Transmission-Gearing, of which the following is a specification, reference being had to the accompanying drawings, forming a part thereof.

My invention relates to improvements in transmission gearing, and particularly to that class of transmission gearing in which changes in speed and direction of drive are brought about by the use of sliding keys.

The main object of my invention is to adapt this class of transmission gearing to automobile construction, though it will be understood that the various features of my invention are equally capable of being employed in other connections. It is common practice in operating automobiles to disconnect the driving motor at the moment the change speed or reverse lever is being moved, in order to avoid shock upon the parts, and my invention consists, first, in the employment of an inertia and momentum device by the use of which sufficient movement will be obtained through the gearing employed to bring the parts in a proper position to insure the proper engagement of the sliding key or keys after the driving motor has been so disconnected and before it is again connected.

My invention also consists in a novel means whereby the parts may be connected in direct driving relation at high speed, and in certain novel details of construction and combinations of parts, such as will be fully pointed out hereinafter.

In order that my invention may be thoroughly understood, I will now proceed to describe an embodiment thereof, having reference to the accompanying drawings illustrating the same, and will then point out the novel features in claims.

In the drawings: Figure 1 is a view in central longitudinal horizontal section through a transmission gearing embodying my invention. Fig. 2 is a detail top view showing particularly the means for controlling the operation of the sliding keys. Fig. 3 is a view in longitudinal section upon the plane of the line 3—3 of Fig. 1. Fig. 4 is a view in transverse section upon the plane of the line 4—4 of Fig. 1. Fig. 5 is a view in transverse section upon the plane of the line 5—5 of Fig. 1, and Fig. 6 is a detail view upon an enlarged scale, in transverse section, upon the plane of the line 6—6 of Fig. 1.

A portion of the main driving or motor shaft is shown at 10 in the drawings, the same being adapted to be thrown into and out of engagement with an intermediate shaft 11 by means of the usual or any desired form of friction clutch 12. The shaft 13 to be driven is arranged in line with the intermediate shaft 11 and driving shaft 10 in the ordinary manner, and a secondary shaft 14 is disposed parallel with the said driven shaft 13, the said shafts 13 and 14 being suitably journaled in a gear casing 15 in the usual or any desired manner. The secondary shaft 14 is arranged in permanent driving relation with the driven shaft 13 by means of a pinion 16 which is permanently located upon the driven shaft 13 and a spur gear 17 which is permanently located upon the secondary shaft 14. Three trains of gearing 18—19—20 are provided between the two shafts 13 and 14, at the opposite ends thereof to which the gears 16 and 17 are located; the trains 18 and 19 comprising each two gears loosely mounted upon the shafts 13 and 14 respectively, and the train 20 comprising three gears two of which are loosely mounted upon the two said shafts, and the other comprising an intermediate or idler gear 21 through which motion is transmitted from one shaft to the other in opposite directions to that in which it is transmitted by the trains of gears 18 and 19. The various gear wheels which, as has just been stated are loosely mounted upon the two shafts 13 and 14, are maintained against longitudinal displacement by means of collars 22 which are secured fast upon the shaft, being preferably clamped rigidly thereon so as also to act as a reinforcement for the said shafts. The two shafts are each provided with a deep slot or key-way 23 for the reception of sliding keys 24—25—26. The keys 25 and 26 are pivotally mounted upon a hub 27 which is mounted to slide freely upon the shaft 13, the keys 25 and 26 being located within the key-way 23 of the said shaft 13, while the key 24 is pivotally mounted upon a hub 28 which is mounted to slide freely upon the shaft 14, the said key 24 being located within the slot or key-way 23 in the said shaft 14. The two hubs 27 and 28 are connected by means of a yoke 29, the said yoke being secured to a carrier 30 which is arranged to slide freely upon a stationary rod or bar 31. The carrier is engaged by a stud or projection 32 upon an arm or lever 33, the said arm or lever being mounted upon a horizontal stud or pin 34, to which is also secured an operating handle or lever 35. A manipulation of the operating handle or lever 35 so as to rock the stud 34 will produce a longitudinal movement of the carrier 30, yoke 29, and hubs 27 and 28, as will be well understood.

The keys 24 and 25 are each provided at their free ends with projecting portions 36 constituting teeth which are adapted for engagement with notches or key-ways 37 in the free gears upon the shafts 13 and 14. The ends of the keys having these projections are forced radially outward by means of coil springs 38 which are housed within the said keys and which bear at their opposite ends upon bearing plates 39 located in the bottom of the said slots or key-ways 23 and adapted to travel along the said slots or key-ways with the said keys 24 and 25. The key 26 is similarly provided with a tooth or projection 40 and coil spring 41 for forcing this portion of the key radially outward and a bearing plate 42 which engages the bottom of the slot or keyway 23 in the shaft 13. The tooth or projection 40 is adapted for engagement with one or more notches or key-ways 43 located in a housing 44 which is secured fast upon the intermediate shaft 11. The shaft 13 is provided with a collar 45, the same being provided with a recess 46 constituting a continuation of the keyway 23 to form a guide for the tooth or projection 40 of the key 26. The flange portion of the said collar to the rear of the housing 44 is provided with an abutment 47 which is adapted to act as a cam to cause the tooth or projection 40 to be withdrawn from engagement with a notch or keyway 43 when the said key is moved to the right as viewed in Fig. 1.

The operation of the device is as follows: Assuming the parts to be in the position shown in Fig. 1 and that the friction clutch 12 so operates as to connect the intermediate shaft 11 with the driving shaft 10, motion imparted to the driving shaft 10 will be transmitted through the intermediate shaft 11 directly to the driven shaft 13 by reason of the fact that the key 26 is in such a position as to lock the said shaft 13 with the said shaft 11, the tooth or projection 40 thereof being in engagement with a notch or keyway 43 of the housing 44 upon the shaft 11. Motion will be transmitted to the secondary shaft through the pinion 16 and spur gear 17, but the gear trains 18, 19 and 20 will be inoperative and idle. When it is desired to transmit motion at a different rate of speed or in a different direction, the handle or lever 35 is operated so as to throw the carrier 30 and yoke 29 to the right, as viewed in Fig. 1. This will carry the keys 24—25 and 26 over to the right, releasing the tooth or projection 40 of the key 26 from engagement with the housing 44 so as to free the shaft 13 from direct engagement with the shaft 11 and bringing the teeth or projections 36 of the keys 24—25 in engagement with gears of any one of the trains 18, 19, or 20 upon the shafts 13 and 14. Assuming the parts to be moved so that the keys 24 and 25 engage the gear wheels comprising the train 19, motion will then be transmitted from the intermediate shaft 11, through the pinion 16 and spur gear 17 to the secondary shaft 14, and thence through the gears 19 to the shaft 13. When the keys are moved to a position where they rest at a point opposite the intermediate collars 22 between any two of the gear trains it will then be apparent that no driving movement at all will be transmitted to the shaft 13. This is because at such time not only are the keys 24 and 25 out of engagement with any gear wheels, but the key 26 is also out of operative engagement with the housing 44 of the intermediate shaft 11. This arrangement will then provide for direct engagement at high speed, intermediate engagement through the back gearing at two lower rates of speed (i. e., through the medium of the gear trains 18 and 19), reverse drive through the gear train 20, and an idle or dead position in which no movements at all are transmitted to the shaft 13.

Whenever a change is made from the dead position to a position engaging the parts in operative driving relation, or whenever a change is made from one speed of drive to another, or from one direction of rotation to another, it is common and proper practice for the driver of a motor vehicle to momentarily release the clutch 12 whereby to relieve the parts as much as possible from the shock which would otherwise result due to the inertia or momentum of the vehicle. At such time the intermediate shaft 11 and the secondary shaft 14 are running free and idle, and in order that the said parts shall run for a sufficient length of time to cause the keys to make their proper engagement, I have provided the intermediate shaft 11 with a fly wheel 48 heavy enough to give the required momentum for the purpose. The provision of this momentum member is quite important because when the parts are to be adjusted for a slow speed or a reverse drive it sometimes takes several revolutions of the intermediate shaft 11 before the said engagement is completed, and if the shaft 11 were to come to rest before such engagement were completed such engagement could thereafter only be completed by again operating the clutch 12 to connect the intermediate shaft 11 with the drive shaft 10 and the completion of the engagement of the keys thereupon would result in an undesired shock.

What I claim is:

1. In transmission gearing the combination with a driving shaft, an intermediate shaft and a driven shaft, of a clutch for connecting and disconnecting the said driving and intermediate shafts, change speed gearing between the intermediate shaft and the driven shaft, and a momentum member carried by the intermediate shaft, substantially as set forth.

2. In transmission gearing the combination with a driving shaft, an intermediate shaft and a driven shaft, all three in line with each other, and a clutch for connecting and disconnecting the driving and intermediate shafts, of a secondary shaft permanently connected to rotate at a lower speed with the said intermediate shaft, change speed gearing between the said driven and secondary shafts including means for connecting different gear wheels with the said shafts, and a momentum member carried by the said intermediate member whereby the intermediate member will continue to revolve after it has been disconnected through the said clutch from engagement with the driving shaft, to the extent sufficient to complete the connection of the proper gear wheel with the driven shaft under change speed conditions.

3. In transmission gearing the combination with a driving shaft, an intermediate shaft and a driven shaft, all arranged in line with each other, of a clutch arranged between the driving shaft and intermediate shaft, a secondary shaft parallel with the driven shaft, gearing permanently connecting the intermediate shaft and secondary shaft to rotate together, the secondary shaft rotating at a lower speed than the intermediate shaft, change speed gearing for connecting the two said shafts together at different speeds, sliding keys for connecting the said gears in different speed relations and also for connecting the driven shaft in direct driving relation with the intermediate shaft, and a momentum member carried by the intermediate shaft to provide for subsequent rotation of the intermediate and secondary shafts after the intermediate shaft has been disengaged from the driving shaft, to insure the proper engagement of the keys with the said gears after their positions have been changed.

4. In transmission gearing of the class described the combination with a driving shaft, an intermediate shaft arranged to be driven thereby, a driven shaft, a secondary shaft, gearing permanently connecting the intermediate and secondary shafts to rotate together, the secondary shaft being arranged to rotate at a lower speed than the intermediate shaft, and change speed gearing, of sliding keys for connecting the said gearing in different relations with the said driven and secondary shafts, a key for connecting the driven shaft in direct driving relation with the intermediate shaft, means for operating the said keys, a clutch between the intermediate and driving shafts for disconnecting them while the said keys are being operated, and a momentum member carried by the said intermediate shaft for carrying on the rotation of the said intermediate and secondary shafts while the intermediate and driven shafts are disconnected and the said keys are being operated.

5. In transmission gearing the combination with a shaft to which power may be applied, a driven shaft in line therewith having a longitudinal groove or keyway therein and a secondary shaft geared to rotate with the said power shaft, of a sleeve upon the driven shaft, two radially movable keys pivoted to the said sleeve and extending in the keyway of the said shaft in opposite directions, a member carried by the first said shaft for direct engagement with one of the said keys when the sleeve is moved in one direction, gearing between the driven and secondary shafts including a gear wheel loosely mounted on the said driven shaft, the other of the said keys being adapted to engage the said gear wheel when the sleeve is moved in the other direction, and means for moving the sleeve longitudinally upon the shaft.

6. In transmission gearing the combination with a shaft to which power may be applied, a driven shaft in line therewith having a longitudinal groove or keyway therein and a secondary shaft geared to rotate with the said power shaft, the secondary shaft being arranged to rotate at a lower speed than the said power shaft, the said secondary shaft also having a longitudinal groove or keyway therein, of sleeves upon the driven and secondary shafts, two radially movable keys pivotally connected to the sleeve upon the driven shaft, said keys located within the keyway in the said shaft and extending in opposite directions therein, another radially movable key pivotally mounted upon the sleeve upon the said secondary shaft and located in the keyway therein, means for simultaneously moving the said keys longitudinally upon the said shafts, a housing carried by the said power shaft for receiving one of the first two mentioned keys when the said keys are moved in one direction, and gear wheels loosely mounted upon the said driven and secondary shafts having notches or keyways therein for receiving the other said keys when the keys are moved in the opposite direction.

CLARK W. PARKER.

Witnesses:
E. C. FINK,
WYMAN C. PARKER.